United States Patent
Pfister (10) Patent No.: US 11,442,167 B2
(45) Date of Patent: Sep. 13, 2022

(54) SENSOR AND AUTONOMOUS VEHICLE

(71) Applicant: SICK AG, Waldkirch (DE)

(72) Inventor: Michael Pfister, Waldkirch (DE)

(73) Assignee: SICK AG, Waldkirch (DE)

( * ) Notice: Subject to any disclaimer, the term of this patent is extended or adjusted under 35 U.S.C. 154(b) by 495 days.

(21) Appl. No.: 16/565,987

(22) Filed: Sep. 10, 2019

(65) Prior Publication Data
US 2020/0081123 A1 Mar. 12, 2020

(30) Foreign Application Priority Data

Sep. 12, 2018 (DE) .......................... 102018122263.7

(51) Int. Cl.
| | |
|---|---|
| G01S 17/04 | (2020.01) |
| G01S 17/93 | (2020.01) |
| G01S 17/89 | (2020.01) |

(52) U.S. Cl.
CPC .............. *G01S 17/04* (2020.01); *G01S 17/89* (2013.01); *G01S 17/93* (2013.01); *B60R 2300/301* (2013.01); *B60W 2420/42* (2013.01); *B60W 2420/52* (2013.01)

(58) Field of Classification Search
CPC .. G01S 17/04; F16P 3/14; F16P 3/142; G01V 8/20
See application file for complete search history.

(56) References Cited

U.S. PATENT DOCUMENTS

| | | | | |
|---|---|---|---|---|
| 7,009,500 | B2 * | 3/2006 | Rao .................... | B60R 21/013 340/435 |
| 2003/0088361 | A1 * | 5/2003 | Sekiguchi ............... | G01S 17/86 340/436 |
| 2004/0066500 | A1 * | 4/2004 | Gokturk ........... | G08B 13/19647 356/4.01 |
| 2006/0178830 | A1 * | 8/2006 | Sherony .................. | G01S 11/12 340/436 |
| 2010/0100276 | A1 * | 4/2010 | Fujinawa ............. | H04N 21/442 348/148 |
| 2014/0032093 | A1 * | 1/2014 | Mills ..................... | B60W 40/10 701/301 |

(Continued)

FOREIGN PATENT DOCUMENTS

| | | |
|---|---|---|
| DE | 69703213 T2 | 4/2001 |
| DE | 10026305 A1 | 11/2001 |

(Continued)

OTHER PUBLICATIONS

European Search Report dated Apr. 24, 2019 for Corresponding EP Application No. 102018122263.7.

*Primary Examiner* — Tan Q Nguyen
(74) *Attorney, Agent, or Firm* — Nath, Goldberg & Meyer; Jerald L. Meyer; Stanley N. Protigal (57) ABSTRACT

An autonomous vehicle having a sensor and a sensor having a plurality of light transmitters and a plurality of light receivers that are arranged in a common housing, with the optical axes of the light transmitters and light receivers being arranged in parallel or in fan form in different angle directions having angular intervals, whereby a protected field is formed, and having a control and evaluation unit for monitoring and evaluating the protected field, wherein a camera is connected to the control and evaluation unit, with camera images of the camera being evaluated by the control and evaluation unit.

13 Claims, 4 Drawing Sheets

(56) References Cited

U.S. PATENT DOCUMENTS

2019/0073785 A1* 3/2019 Hafner ...................... G06T 7/11
2019/0204845 A1* 7/2019 Grossman ............. G01S 7/4813

FOREIGN PATENT DOCUMENTS

| DE | 10154861 A1 | 5/2003 |
| DE | 102004038906 A1 | 3/2006 |
| DE | 102006053002 A1 | 5/2008 |
| DE | 102010007520 B3 | 5/2011 |
| DE | 202010012985 U1 | 4/2012 |
| DE | 102012007242 A1 | 9/2013 |
| DE | 202017102411 U1 | 6/2017 |
| DE | 102016103028 A1 | 8/2017 |
| EP | 1927867 A1 | 6/2008 |
| EP | 3217195 A1 | 9/2017 |

* cited by examiner

SENSOR AND AUTONOMOUS VEHICLE

FIELD

The present invention relates to a sensor having a plurality of light transmitters and a plurality of light receivers that are arranged in a common housing, with the optical axes of the light transmitters and light receivers being arranged in parallel or in fan form in different angle directions having angular intervals, whereby a protected field is formed, and having a control and evaluation unit for monitoring and evaluating the protected field and to an autonomous vehicle having such a sensor.

BACKGROUND

Autonomous vehicles such as mobile platforms, automated guided vehicle systems, or automated guided vehicles are equipped with sensor systems for the protection of persons and for protection against collisions.

Laser scanners or safety laser scanners are, for example, used to secure automated guided vehicle systems.

SUMMARY

An object of the invention comprises providing an improved sensor that can be diagnosed better or that can be used for better object recognition.

The object is satisfied in accordance with claim 1 by a sensor having a plurality of light transmitters and a plurality of light receivers that are arranged in a common housing, with the optical axes of the light transmitters and light receivers being arranged in parallel or in fan form in different angle directions having angular intervals, whereby a protected field is formed, and having a control and evaluation unit for monitoring and evaluating the protected field, with a camera being connected to the control and evaluation unit and with the camera images being evaluated by the control and evaluation unit.

The sensor can be a safety sensor or an unsafe sensor. It is possible with the aid of the camera to provide diagnostic images and/or configuration images for the sensor. In accordance with the invention, a system having a sensor and a camera, and the control and evaluation unit is provided.

The camera is, for example, connected to the sensor via an interface. The camera can, for example, be arranged in its own, separate housing. The interface can be a wired or a wireless interface. The wired interfaces are, for example, Ethernet or other networks or field buses. The wireless interfaces are, for example, wireless Ethernet (wireless LAN), wireless near field communication (NFC), or Bluetooth, for example.

The camera images are, for example, stored in a memory of the sensor, in a central memory of a system, or in a decentral cloud store.

For this purpose, for example, software tools of the manufacturer are provided such as uniform operating, configuration and administration software, for example with the names SOPAS, SOPAS Air or Safety Designer of the applicant.

A plurality of switchable protected fields are, for example, provided in accordance with the invention. The protected fields are then, for example, switched over in dependence on the detected camera image.

The distances of the individual beams of the light transmitters optionally increase in size as the distance from the optoelectronic sensor increases and/or the distances of the received beams of the light receivers optionally decrease in size as the distance from the optoelectronic sensor decreases.

The sensor can be a safety sensor. In accordance with the present invention, safety is safety in the sense of machine safety. The standard EN/IEC 61496, for example, regulates the demands on a safe sensor or on safe electro-sensitive protective equipment (ESPE) for securing hazardous zones. Machine safety is regulated in the standard EN 13849. Safety is, for example, ensured by a two-channel design or a design diverse in two channels of a control and evaluation unit for error localization and for a functional test. The distance measuring sensor or distance sensor in accordance with the present invention is designed, for example, as intrinsically safe and recognizes internal errors. An error signal is generated, for example, on discovery of an error. The sensor or distance sensor furthermore optionally has a sensor testing.

The control and evaluation unit recognizes protected field infringements and can output a safety relevant switch-off signal to stop a hazardous movement of a machine or of a vehicle or of a part of a machine or to brake the machine, the part of the machine, or a vehicle. This can e.g. be implemented via safe switching signals, e.g. OSSD signals (output safety switching device signals) or safe distance data, spacing data or safe spatial data of the intrusion event.

The sensor in accordance with the invention is of a simple and inexpensive design. Since the sensor manages without any mechanically movable parts, it has no mechanical wear and has a long service life. A required duration of use of, for example, 20 years can be satisfied by the sensor in accordance with the invention.

The optional angular interval preferably only amounts to a few degrees. For example 1° to 20°, or 1° to 10°, or 1° to 5°.

In accordance with the invention, the light beams are transmitted or received in fan form in different angular directions, whereby a monitored zone can be simply examined as to whether objects are present in the monitored zone or not and at which point, i.e. at which distance, the objects are present. The objects can furthermore be measured or a surrounding contour and its change can be detected. The monitored zone is monitored within a fan-shaped plane due to the fan-shaped transmission of the light beams or due to the fan-shaped reception.

The light transmitters or the light receivers are, for example, arranged radially symmetrically in the periphery of a cylinder. The laser scanner can be manufactured with a high angular accuracy since the light transmitters and the light receivers are firmly fixed and the light beams move directly into the monitored zone without any moving parts. During the production of the laser scanner, the angular accuracy of the angle directions can be checked and set. It is thereby ensured that every laser scanner observes a specific demanded minimum angular accuracy.

In a further development of the invention, the sensor is a sensor in accordance with the time of flight process.

A time of flight sensor is, for example, based on a time of flight chip in accordance with the PMD process which carries out distance measurements on the basis of a phasing measurement of modulated light.

A distance sensor or light scanner in accordance with the time of flight principle has at least one light transmitter which transmits consecutive light pulses into a measured zone and has at least one light receiver which receives the light pulses reflected at an object in the measured zone and supplies them in the form of received electrical signals to a control and evaluation unit which determines a distance signal representative of the distance of the object from the light sensor while taking account of the speed of light from the time between transmission and reception of the light pulse.

In accordance with the invention, a light receiver of the distance sensor has at least one array of single photon avalanche diodes.

Single photon avalanche diodes are also simply called SPADs. Other common terms are 'silicon photomultiplier' (SiPM). 'Geiger mode avalanche photo diode' or 'single photon counting diode'. Single photo avalanche diodes are photosensitive detectors which can be implemented in standard CMOS technology and which, in a similar manner to avalanche photo diodes, convert incident photons into current pulses. Unlike avalanche photo diodes, however, single photon avalanche diodes are operated over a breakdown voltage. A single incident photon thus already triggers an avalanche effect which can be detected as a current pulse. Due to the high sensitivity, namely an amplification factor of $10^6$, even the smallest received powers down to single photons can be detected.

A use of a time of flight sensor, in particular the use of single-photon avalanche diodes in combination with pulse lasers deliver distance information with a precision of, for example, up to approximately one millimeter. At the same time, a simple attachment optics allows the implementation of good spatial selectivity and a delineation with respect to interfering light via a focusing.

Different time of flight methods with a corresponding evaluation can be implemented for the distance measurement.

A pulse method can be provided. For example, one or more time-to-digital converters can be provided for the pulse method in which each single photon event is provided with a time stamp. With a wanted signal, a plurality of time stamps therefore occur in correlation. The measured value generation takes place statistically. Background light, in contrast, generates randomly distributed time stamps.

Furthermore, a CW (continuous wave) process can be used, with a light signal being used which is modulated constantly in time. In this method, the single photon events are distributed via a gating signal into two counters and a phase is calculated from the ratio of the counts.

Furthermore, analog signals of the single photon diode array can be evaluated. They are compared with a threshold value, are sampled, or are evaluated using statistical methods.

In the evaluation according to the time of flight process, an amplitude value can also be generated in addition to the distance value, e.g. by a histogram of the time stamps, by a count rate or by a voltage amplitude in an analog evaluation. A validation can be carried out by the amplitude value, in particular in technical safety applications.

The use of single photon avalanche diodes offers the following advantages: Single photon avalanche diodes can be manufactured in a standard CMOS process. The light scanner thus offers high integration capability, e.g. as an ASIC. The light transmitter, for example a VSCEL, a laser diode or a light emitting diode, and the control and evaluation unit or a separate light transmitter control can likewise be integrated on the chip or in the housing.

The distance sensor or light sensor is less expensive than photosensitive receivers previously customary in safety technology. Very compact systems are possible by a multiple arrangement of light sensors. A high sensitivity down to single photons is given by the use of single photon avalanche diodes. An optional optics can thereby be designed in a very compact manner.

In a further development of the invention, the camera is arranged in the housing of the sensor. The camera is thereby already integrated and is optionally already fixedly aligned. The camera is thereby arranged in a protected manner and is insensitive to environmental influences. The camera can be arranged settably and adjustably in the housing.

In a further development of the invention, the field of view of the camera is directed to the protected field and at least the region of the protected field is detected by the camera. Events in the protected field, for example interventions in the protected field, can thereby be analyzed by the camera. The reason for the carrying out of the intervention can thus be determined by the camera. It can thus, for example, be determined that malicious unpermitted interventions by non-authorized persons are taking place in the protected field or that, for example, an intervention in the protected field is taking place on the basis of specific disruptions such as interfering objects. The camera can be activated permanently or at times for this purpose.

In a further development of the invention, an event in the protected field triggers a recording of the camera. The camera can thus be triggered by the intervention or by a specific event in the protected field. The camera recording is thereby only activated and the recording stored on the intervention or event. Rare interventions or events can thereby be detected without the camera being constantly activated or without the camera images having to be constantly stored. Provision is, however, also made that the camera images of a brief time period are constantly saved and that the recording is stopped on an intervention or on an event so that the prior history of the intervention is documented by the stored camera images.

A trigger for the camera can, however, also be triggered by an external event of the machine control. Machine signals that can be read in via an interface can thus be triggers for the camera, for example. Provision can thus be made, for example, that the production articles are detected and recorded by the camera in ongoing production, in order, for example, to carry out a presence check, a service check, or a quality control.

In a further development of the invention, a recording mode of the camera can be set in the control and evaluation unit. The recording mode of the camera can, for example, be a film mode, a single frame mode, or a multi-frame mode. Furthermore, cyclic image recordings or fast-motion recordings can be provided as the recording mode.

In a further development of the invention, the camera recordings of the camera that have led to an intervention in the protected field are evaluated by the control and evaluation unit. The recordings made by the camera before and after an intervention in the protected field are stored and analyzed in this process. The camera here, for example, continuously records images temporarily that are then permanently stored on an intervention in the protected field. In this respect, the observed scenes are classified, evaluated, and subsequently stored. It can thus be determined, for example, whether interventions in the protected field took place by a person, by materials, or, for example, by material handling vehicles. The reasons for an intervention in the protected field can thus be classified and/or diagnosed.

In a further development of the invention, a repetition rate of recordings for the camera can be changed in the control and evaluation unit. The repetition rate is, for example, adapted in dependence on the frequency of interventions in the protected field. The repetition rate of recordings is, for example, reduced in dependence on a high number of interventions per time unit in the protected field. The repetition rate of the recordings can, for example, be set in the intervals 1 second, 2 seconds, 5 seconds, 10 seconds, 30 seconds, 1 minute, or 5 minutes, etc.

The repetition rate and/or a maximum repetition rate for recordings can furthermore be preset, for example generally or, for example per class. For example, 5 recordings per minute or 5 recordings per hour can be preset.

Recording times can furthermore also be ignored so that no recordings are saved in specific intervals. If, for example, a new part or a new object is delivered every minute and if a permitted interruption of the light beams takes place as a result, a preset can be made in the control and evaluation unit that no recordings take place when the part or the object is delivered. However, recordings are still made and evaluated before and after the permitted interruption. The time duration of the delivery and of the permitted interruption of the sensor can, for example, last 20 seconds.

In a further development of the invention, the control and evaluation unit is configured to carry out a code recognition on the basis of the camera recording and symbols of a barcode or of a matrix code are readable by the control and evaluation unit. Provided configurations in the sensor can thereby be activated.

Provision can thus be made, for example, that barcodes applied to packages are read and a change of the active protected fields is made in dependence on the read barcodes. The detected barcode information can here also be forwarded to processes and systems located downstream, whereby a production plant can be controlled.

In a further development of the invention, the control and evaluation unit is configured to carry out an object recognition on the basis of the camera recording and to distinguish permitted objects from unpermitted objects and to suppress an object determination signal of the sensor with permitted objects. Objects that pass through a passage to a processing station are, for example, detected by the camera. The objects are detected and identified by the camera. If they are permitted objects, the sensor is muted, i.e. bridged, so that the objects can pass through the passage. If, however, unpermitted objects such as persons who may not pass through the passage are detected, the sensor remains active and the persons are detected by the sensor, whereby the hazardous movement is stopped, for example.

In a further development of the invention, the camera is a camera based on the time of flight process. The camera itself can thereby generate three-dimensional images, whereby a better object recognition or object classification is made possible.

In a further development of the invention, an output interface for measured data is provided. The output interface is connected to the control and evaluation unit.

Range images or distance images can be output via the output interface, for example. The range images can, for example, represent depth maps of the recording via a color coding or a false color representation. For example, continuously recorded range images can be used for a mapping of a factory floor or, for example, navigation data for simpler autonomous transport vehicles are prepared.

The range images or the distance images can furthermore be used for an upstream quality control and/or completeness control.

For example, in accordance with a further development of the sensor, a recording of an object can take place, for example, of a box and possible associated code information, for example barcode information, can be evaluated. In addition, the objects are stored in a database with additional information such as volume indications or dimensions of the objects that can be combined with the data of the output interface.

In a further development of the invention, an object determination signal can be suppressed for permitted objects, with this function also being able to take place as muting or as masking or as partial masking of beam axes. The suppression of the object determination signal can thus be based on the combination of dimensions, that is the width and/or height and/or depth and/or height of the object and/or the speed and/or an object color and/or an object structure of the object. For example, only gray packages having small labels and, for example, a specific speed, for example 1 m/is are classified as permitted objects with a tolerance of +/−20%.

For example, a suppression of the object determination signal on a muting or on a masking can only take place when, for example, an object speed detected by the sensor and/or by the camera agrees with a predefined desired speed. The desired speed is either fixedly configured in the control and evaluation unit of the sensor or is preset by external signals via an input interface. For example, encoder signals of an external encoder or a 1-of-n evaluation of e.g. two inputs can be carried out. A machine thus, for example, works at a speed in normal operation of e.g. 1 m/s and in setup mode of e.g. 0.1 m/s.

In a further development of the invention, an autonomous vehicle has a sensor in accordance with the invention.

Since the sensor manages without any moving parts that may, for example, be exposed to accelerations on a use in vehicles, the sensor in accordance with the invention is less sensitive to vibration loads and shock loads and can therefore be used without problem in mechanically moved objects such as vehicles, in particular industrial trucks. Since the sensor manages without any moving parts, the sensor can also have a very compact design.

The camera can, for example, already be used on the taking into operation of the autonomous vehicle. The camera can thus actively generate images of the environment and can store them on a first traveling over an environment, for example a warehouse floor, for the purposes of mapping, that is a detection of the environment. The spatial environment of the vehicle can be reconstructed from the images. The corners, edges, walls, surfaces, columns, routes, etc. can, for example, be recognized and taught in this process.

BRIEF DESCRIPTION OF THE DRAWINGS

The invention will also be explained in the following with respect to further advantages and features with reference to the enclosed drawing and to embodiments. The Figures of the drawing show in.

DETAILED DESCRIPTION

In the following Figures, identical parts are provided with identical reference numerals.

Figure 1:
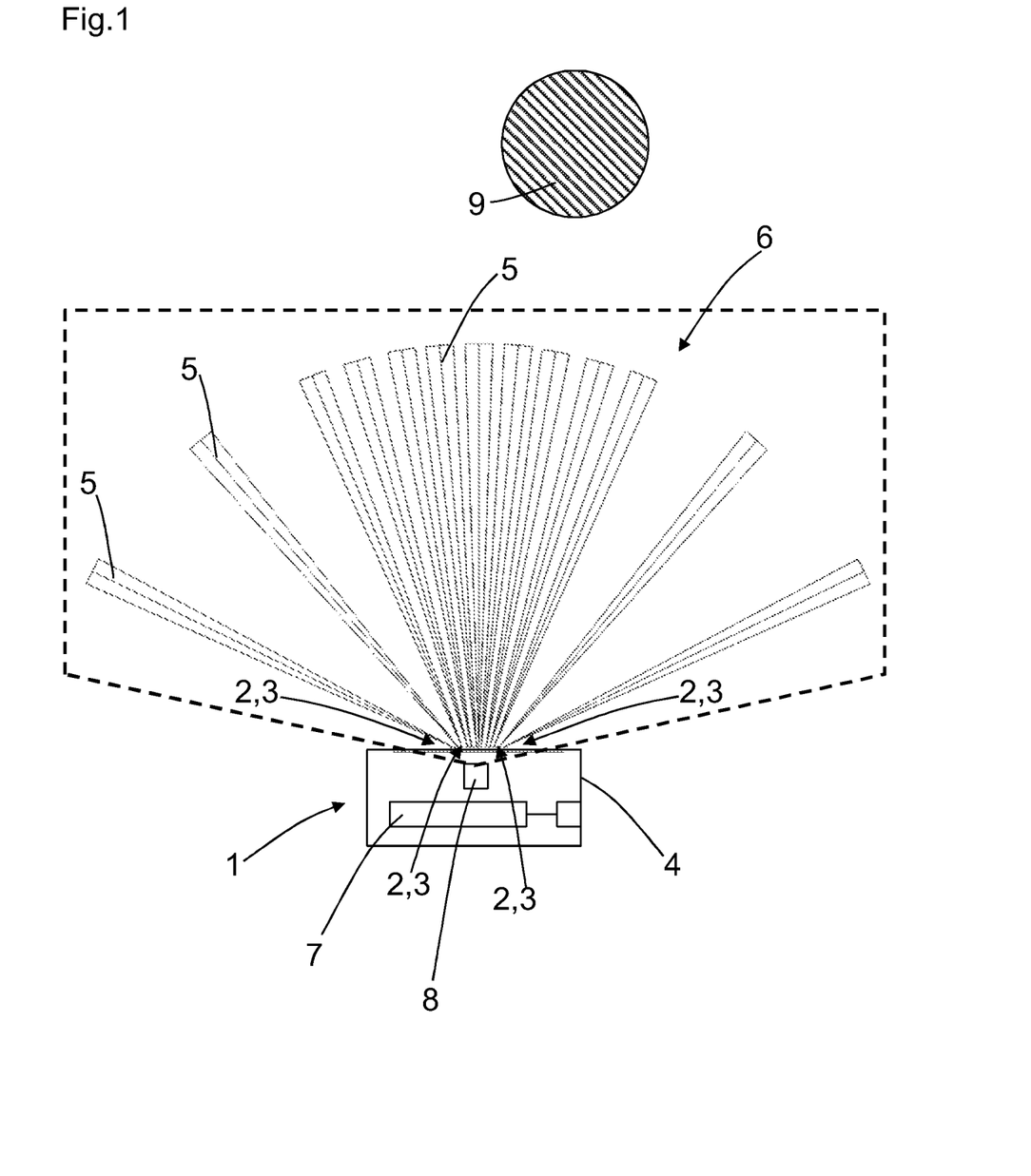
FIG. 1 a sensor with a fan-shaped protected field and a camera.

FIG. 1 shows a sensor 1 having a plurality of light transmitters 2 and a plurality of light receivers 3 that are arranged in a common housing 4, with the optical axes 5 of the light transmitters 2 and light receivers 3 being arranged in fan form in different angle directions having angular intervals, whereby a protected field 6 is formed, and having a control and evaluation unit 7 for monitoring and evaluating the protected field 6, with a camera 8 being connected to the control and evaluation unit 7 and with the camera images being evaluated by the control and evaluation unit 7.

The sensor 1 can be a safety sensor or an unsafe sensor. It is possible with the aid of the camera 8 to provide diagnostic images and/or configuration images for the sensor 1.

The camera 8 is, for example, connected to the sensor 1 via an interface. The interface can be a wired or a wireless interface.

The camera images are, for example, stored in a memory of the sensor, in a central memory of a system, or in a decentral cloud store.

A plurality of switchable protected fields 6 are, for example, provided in accordance with the invention. The protected fields 6 are then, for example, switched over in dependence on the detected camera image.

The control and evaluation unit 7 recognizes protected field infringements and can output a safety relevant switch-off signal to stop a hazardous movement of a machine or of a vehicle or of a part of a machine or to brake the machine, the part of the machine, or a vehicle. This can e.g. be implemented via safe switching signals, e.g. OSSD signals (output safety switching device signals) or safe distance data, spacing data or safe spatial data of the intervention event.

The angular interval preferably only amounts to a few degrees. For example 1° to 20°, or 1° to 10°, or 1° to 5°.

In accordance with FIG. 1, the light beams are transmitted or received in fan form in different angular directions, whereby a monitored zone can be simply examined as to whether objects 9 are present in the monitored zone or not and at which point, i.e. at which distance, the objects 9 are present. The objects 9 can furthermore be measured or a surrounding contour and its change can be detected. The monitored zone is monitored within a fan-shaped plane due to the fan-shaped transmission of the light beams or due to the fan-shaped reception. The light transmitters 2 or light receivers 3 can, for example, also be radially symmetrically arranged in the periphery of a cylinder. The sensor can be manufactured with a high angular accuracy since the light transmitters and the light receivers are firmly fixed and the light beams move directly into the monitored zone without any moving parts. During the production of the sensor, the angular accuracy of the angle directions can be checked and set. It is thereby ensured that every sensor observes a specific demanded minimum angular accuracy.

In accordance with FIG. 1, the sensor 1 is a sensor 1 in in accordance with the time of flight process.

In accordance with FIG. 1, the camera 8 is arranged in the housing 4 of the sensor 1. The camera 8 is thereby already integrated and is optionally already fixedly aligned. The camera 8 can be arranged settably and adjustably in the housing 4.

In accordance with FIG. 1, the field of view of the camera 8 is directed to the protected field 6 and at least the region of the protected field 6 is detected by the camera 8. Events in the protected field 6, for example interventions in the protected field 6, can thereby be analyzed by the camera 8. The reason for the carrying out of the intervention can thus be determined by the camera 8. The camera 8 can be activated permanently or at times for this purpose.

In accordance with FIG. 1, an event in the protected field 6 starts a recording of the camera 8. The camera 8 can thus be triggered by the intervention or by a specific event in the protected field 6. The camera recording is thereby only activated and the recording stored on the intervention or event. Rare interventions or events can thereby be detected without the camera 8 being constantly activated or without the camera images having to be constantly stored. Provision is, however, also made that the camera images of a brief time period are constantly saved and that the recording is stopped on an intervention or on an event so that the prior history of the intervention is documented by the stored camera images.

Figure 2:
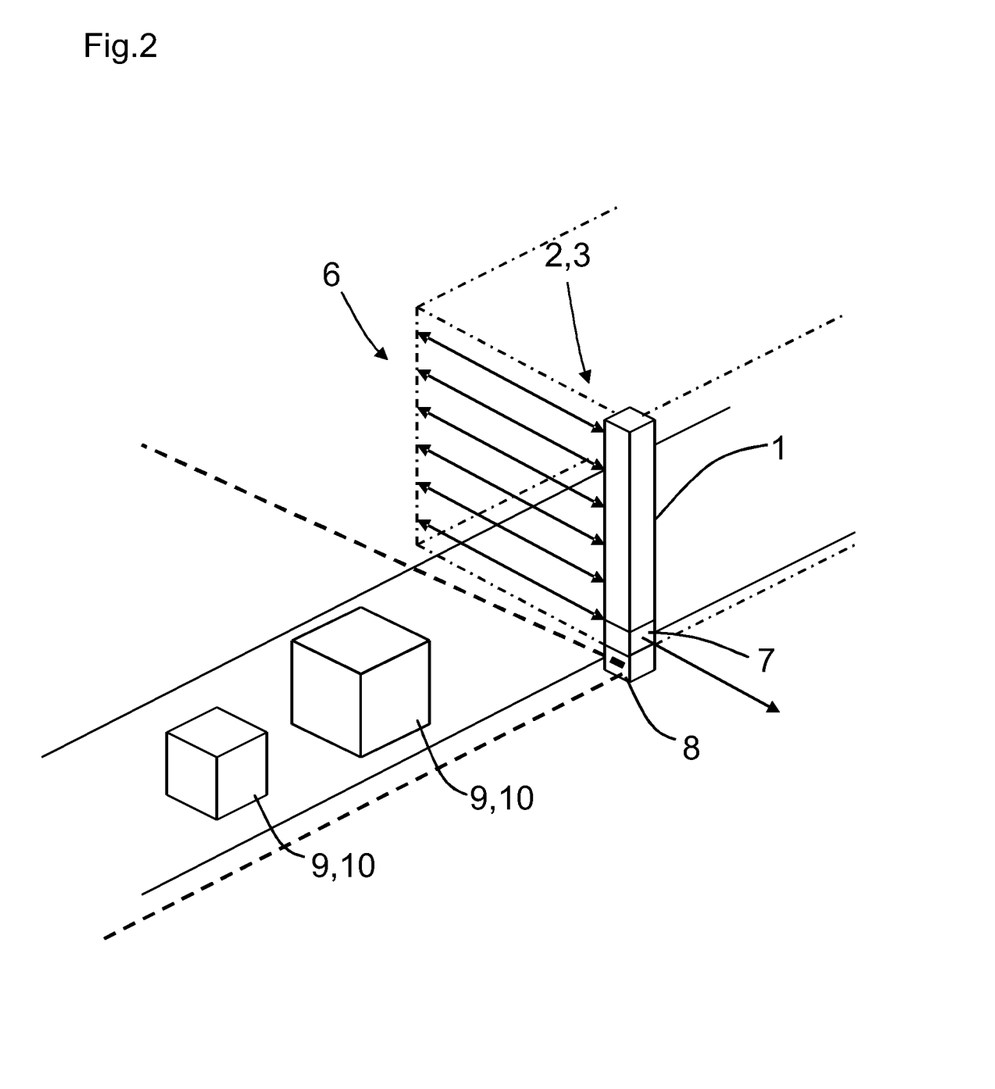
FIG. 2 a sensor with parallel optical axes and a camera.

A trigger for the camera 8 can, however, also be triggered by an external event of the machine control in accordance with FIG. 2. Machine signals that can be read in via an interface can thus be triggers for the camera 8, for example. Provision can thus be made, for example, that the production articles or objects 9 are detected and recorded by the camera 8 in ongoing production, in order, for example, to carry out a presence check, a service check, or a quality control.

In accordance with FIG. 2, a recording mode of the camera 8 can be set in the control and evaluation unit 7. The recording mode of the camera 8 can, for example, be a film mode, a single frame mode, or a multi-frame mode.

In accordance with FIG. 2, the control and evaluation unit 7 is configured to carry out an object recognition on the basis of the camera recording and to distinguish permitted objects 10 from unpermitted objects and to suppress an object determination signal of the sensor 1 with permitted objects 10. Objects 9 that pass through a passage to a processing station are, for example, detected by the camera 8. The objects 9 are detected and identified by the camera 8. If they are permitted objects 10, the sensor 1 is muted, i.e. bridged, so that the objects 9 can pass through the passage. If, however, unpermitted objects such as persons who may not pass through the passage are detected, the sensor 1 remains active and the persons are detected by the sensor 1, whereby a hazardous movement is stopped, for example.

In accordance with FIG. 2, the camera 8 is a camera 8 in accordance with the time of flight process. The camera 8 itself can thereby generate three-dimensional images, whereby a better object recognition or object classification is made possible.

Figure 3:
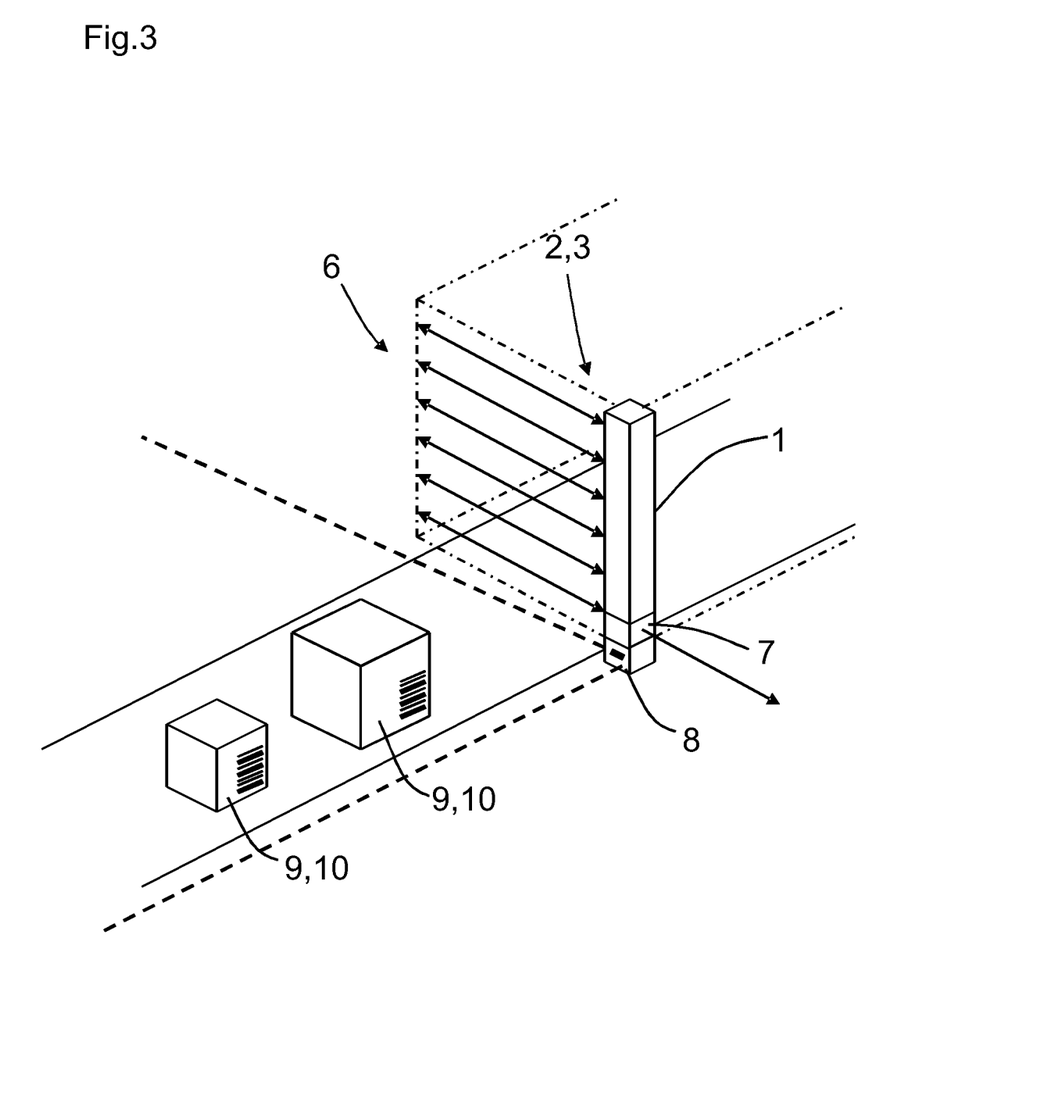
FIG. 3 a sensor with parallel optical axes and a camera for recognizing barcodes.

In accordance with FIG. 3, the control and evaluation unit 7 is configured to carry out a code recognition on the basis of the camera recording and symbols of a barcode or of a matrix code are readable by the control and evaluation unit 7. Provided configurations in the sensor 1 can thereby be activated. Provision can thus be made, for example, that barcodes applied to packages or objects 9 are read and a change of the active protected fields 6 is made in dependence on the read barcodes. The detected barcode information can here also be forwarded to processes and systems located downstream, whereby a production plant can be controlled.

Figure 4:
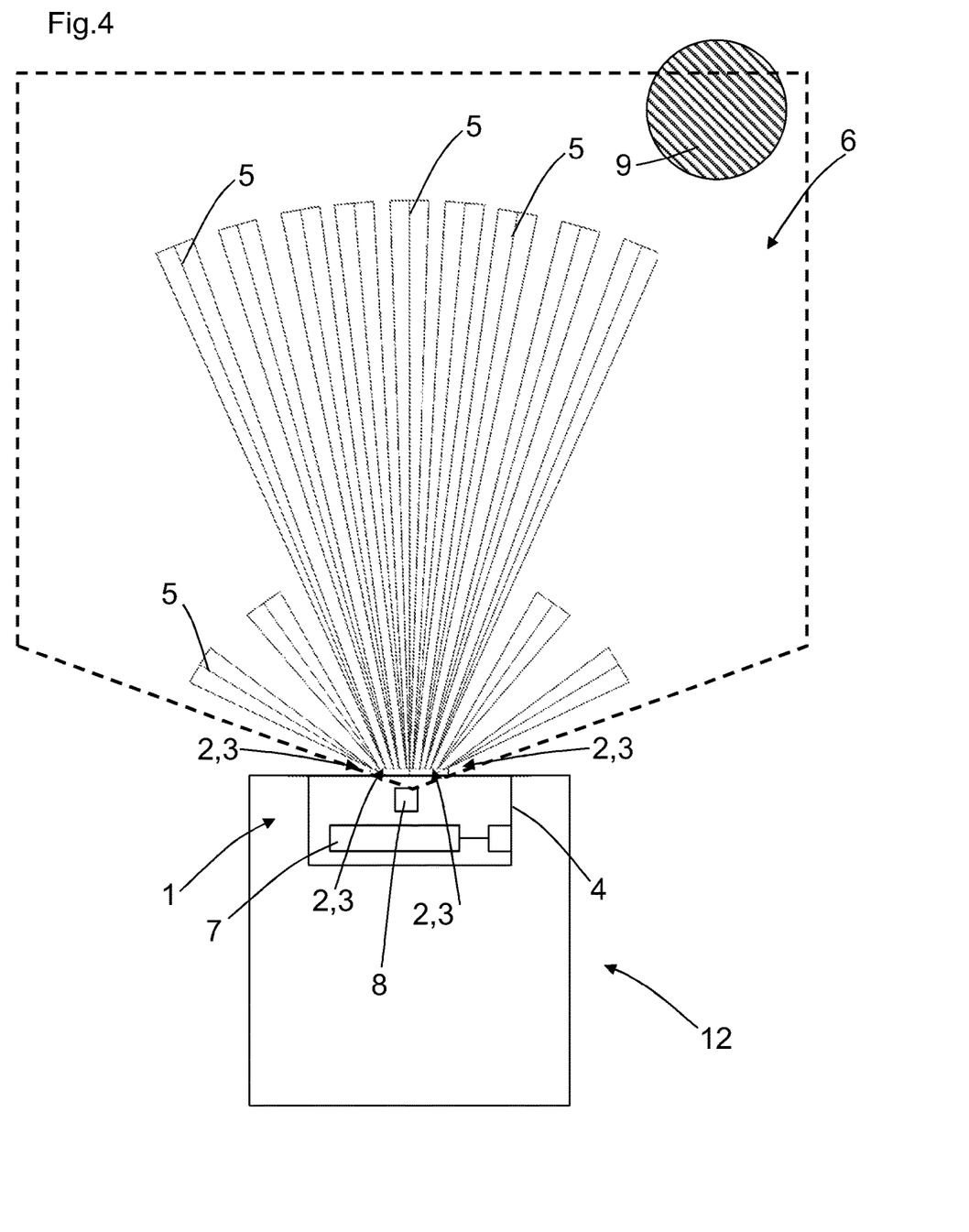
FIG. 4 an autonomous vehicle with a sensor and a camera.

In accordance with FIG. 4, an autonomous vehicle 12 has a sensor 1 in accordance with the invention.

The camera 8 can, for example, already be used on the taking into operation of the autonomous vehicle 12. The camera 8 can thus actively generate images of the environment and can store them on a first traveling over an environment, for example a warehouse floor, for the purposes of mapping, that is a detection of the environment. The spatial environment of the vehicle 12 can be reconstructed from the images. The corners, edges, walls, surfaces, columns, routes, etc. can, for example, be recognized and taught in this process.

REFERENCE NUMERALS 1 sensor
2 light transmitter
3 light receiver
4 housing
5 optical axis
6 protected field
7 control and evaluation unit
8 camera
9 object
10 permitted object
12 autonomous vehicle

The invention claimed is:

1. A sensor comprising:
a plurality of light transmitters and a plurality of light receivers arranged in a common housing, with the optical axes of the light transmitters and light receivers arranged in parallel or in fan form in different angle directions having angular intervals, whereby a protected field is formed; and
a control and evaluation unit for monitoring and evaluating the protected field,
wherein a camera is connected to the control and evaluation unit, with camera images of the camera being evaluated by the control and evaluation unit,
and wherein a plurality of switchable protected fields are provided, with the protected fields being switched over in dependence on the detected camera image, and with the field of view of the camera directed to the protected field and at least the region of the protected field detected by the camera.

2. The sensor in accordance with claim 1, wherein the sensor is a sensor in accordance with the time of flight process.

3. The sensor in accordance with claim 1, wherein the camera is arranged in the housing.

4. The sensor in accordance with claim 1, wherein an event in the protected field starts a recording of the camera.

5. The sensor in accordance with claim 1, wherein a recording mode of the camera is settable in the control and evaluation unit.

6. The sensor in accordance with claim 1, wherein the camera recordings of the camera that have led to an intervention in the protected field are evaluated by the control and evaluation unit.

7. The sensor in accordance with claim 1, wherein a repetition rate of recordings for the camera is changeable in the control and evaluation unit.

8. The sensor in accordance with claim 1, wherein the control and evaluation unit carries out a code recognition on the basis of the camera recording; and wherein symbols of a barcode or of a matrix code can be identified by the control and evaluation unit.

9. The sensor in accordance with claim 1, wherein the control and evaluation unit carries out an object recognition on the basis of the camera recording of the camera and distinguishes permitted objects from unpermitted objects and suppresses an object determination signal of the sensor with permitted objects.

10. The sensor in accordance with claim 1, wherein the camera is a camera in accordance with the time of flight process.

11. The sensor in accordance with claim 1, wherein an output interface for measured data is provided.

12. An autonomous vehicle comprising:
a sensor, having a plurality of light transmitters and a plurality of light receivers arranged in a common housing, with the optical axes of the light transmitters and light receivers arranged in parallel or in fan form in different angle directions having angular intervals, whereby a protected field is formed; and
the sensor further having a control and evaluation unit for monitoring and evaluating the protected field,
wherein a camera is connected to the control and evaluation unit, with camera images of the camera being evaluated by the control and evaluation unit,
and wherein a plurality of switchable protected fields are provided, with the protected fields being switched over in dependence on the detected camera image, and with the field of view of the camera directed to the protected field (6) and at least the region of the protected field detected by the camera.

13. The autonomous vehicle in accordance with claim 12, wherein the sensor is a sensor in accordance with the time of flight process.

* * * * *